US007808376B2

(12) United States Patent
Terzian

(10) Patent No.: US 7,808,376 B2
(45) Date of Patent: *Oct. 5, 2010

(54) CONTINUOUS ENHANCED VEHICLE HAZARD WARNING LIGHTS

(75) Inventor: Berj A. Terzian, Newbury, MA (US)

(73) Assignee: Trixcel, LLP, Newbury, MA (US)

(*) Notice: Subject to any disclaimer, the term of this patent is extended or adjusted under 35 U.S.C. 154(b) by 297 days.

This patent is subject to a terminal disclaimer.

(21) Appl. No.: 12/136,370

(22) Filed: Jun. 10, 2008

(65) Prior Publication Data
US 2009/0303029 A1 Dec. 10, 2009

(51) Int. Cl.
B60Q 1/52 (2006.01)
(52) U.S. Cl. .................... 340/471; 340/463; 340/464
(58) Field of Classification Search ................ 340/471, 340/463, 464, 468, 472, 479
See application file for complete search history.

(56) References Cited

U.S. PATENT DOCUMENTS

| 4,682,146 | A | | 7/1987 | Friedman, III |
| 4,859,988 | A | | 8/1989 | Holtvluwer |
| 5,119,067 | A | * | 6/1992 | Adell .................... 340/468 |
| 5,345,218 | A | | 9/1994 | Woods et al. |
| 5,444,620 | A | * | 8/1995 | Yeh ..................... 340/471 |
| 5,528,218 | A | | 6/1996 | Rigsby |
| 5,585,782 | A | * | 12/1996 | Yosko .................... 340/471 |
| 5,663,706 | A | * | 9/1997 | Francis ................... 340/472 |
| 5,663,707 | A | * | 9/1997 | Bartilucci ................ 340/472 |
| 5,786,752 | A | | 7/1998 | Bucalo et al. |
| 5,798,687 | A | | 8/1998 | Littlejohn et al. |
| 5,852,399 | A | | 12/1998 | Pettijohn |
| 5,923,124 | A | | 7/1999 | Paech |
| 6,025,775 | A | | 2/2000 | Erlandson |
| 6,181,243 | B1 | | 1/2001 | Yang |
| 7,352,278 | B2 | * | 4/2008 | Terzian .................. 340/471 |
| 2003/0043033 | A1 | | 3/2003 | Lee |

OTHER PUBLICATIONS

Federal Register/vol. 61 No. 241/Friday, Dec. 13, 1996, Notice 01, Federal Motor Vehicle Safety Standards; Lamps, Reflective Devices and Associated Equipment, pp. 65510-65518.
Federal Register/vol. 63 No. 213/Wed, Nov. 4, 1998, Federal Motor Vehicle Safety Standards; Lamps, Reflective Devices and Associates Equipment, pp. 59482-59492.
Field Test Evaluation of Rear Lighting Deceleration Signals II- Field Test, Oct. 1981, Final Report, Rudolf G. Mortimer, pp. 1 to 7 introduction and Table of Contents, pp. 1-23 Introduction, 4 pages Appendix.

* cited by examiner

Primary Examiner—John A Tweel, Jr.
(74) Attorney, Agent, or Firm—Lucas & Mercanti, LLP

(57) ABSTRACT

Potential disadvantages of the enhanced emergency hazard warning lights set forth in U.S. Pat. No. 7,352,278 are overcome by adding a lamp that beams its light rearward toward approaching traffic, is located approximately midway between and above the horizontal alignment of the rear turn signal lamps, thereby forming a triangular flashing emergency hazard warning signal that cannot be discontinued or otherwise disturbed when the vehicle's brakes and brake lights are simultaneously operated.

14 Claims, 1 Drawing Sheet

CONTINUOUS ENHANCED VEHICLE HAZARD WARNING LIGHTS

BACKGROUND OF THE INVENTION

1. Field of the Invention

This invention relates to vehicle hazard warning lights and, more particularly, to the enhancement of such lights to become continuous and thus give more effective warnings that a disabled or stalled vehicle is a hazard to other vehicles approaching from the rear.

2. Description of the Prior Art

The present applicant's assignee Tritel, LLC received U.S. Pat. No. 7,352,278 B2 ("'278 patent") on Apr. 1, 2008, the entirety of which is incorporated by reference herein. This patent, entitled Vehicle Hazard Warning Lights, describes an enhancement of hazard lights by transmitting pulsed electrical current from a vehicle's 4-way emergency flasher not only to the 4-way emergency lamps, normally the four front and back turn signals, but also to a vehicle's Center High Mounted Stop Light ("CHMSL").

As a result, a flashing triangle is displayed when the 4-way flasher circuit is turned on, instead of the conventional hazard lights which normally are the horizontally aligned left and right turn signal lamps in the vehicle's rear. Thus, the flashing triangle gives a more effective warning signal due to the much larger geometry created by the triangle, as explained in the '278 Patent.

However, there is an inherent problem in the prior hazard light system because its triangular shape discontinues when the vehicle's service brakes are engaged. This happens because an automatic flow of a continuous electrical current from the brake light circuit enters the CHMSL, which will override and suppress the pulsed current simultaneously being transmitted to the CHMSL from the 4-way flasher circuit.

This feature was a necessity since the regulations of the National Highway Traffic Safety Administration ("NHTSA") have long mandated that the CHMSL must be illuminated when the service brakes are engaged. Compliance with this requirement in the '278 Patent system would cause the flashing triangular hazard signal to fluctuate randomly between triangular and conventional double horizontal emergency lamps when the vehicle's service brakes are engaged and disengaged, as needed by an approaching driver to safely slow or stop a vehicle in an emergency situation. These fluctuations could cause uncertainty or confusion to drivers approaching the hazard flashing vehicles by wondering why or how such alterations are happening and what they signify.

These problems should not be disregarded in view of the awful carnage that occurs every year on USA roads and highways from rear end collisions. NHTSA statistics indicate that annually there are 1.5 million rear end crashes that cause 2,000 deaths, 950,000 injuries and $18.3 of economic losses (Google: "ITS6 IVHS Countermeasures"). These staggering figures are powerful reasons why every potential or possible disadvantage in the '278 Patent hazard light system should be addressed and overcome to achieve certainty that the maximum efficacy of the system is available. It is believed that this will significantly reduce the huge losses of life, health, property and economics that rear end collisions yearly generate.

SUMMARY OF THE INVENTION

The present invention provides a simple, effective and inexpensive solution to the above disadvantage of the '278 patent hazard light system. In particular, addition of another lamp to the system can and does eliminate all of the difficulties that have been explained above in view of having to comply with NHTSA's requirements concerning the CHMSL that are in every USA passenger vehicle and light truck.

Further features and details of the invention will be understood by reference to the drawings and the following specific description.

DESCRIPTION OF THE DRAWINGS

Referring to FIG. 1, the rear window 10 of the vehicle includes at the top CHMSL 12. Below CHMSL 12 is another lamp 14 located approximately midway between the vehicle's left and right turn signal lamps 16. Lamp 14 is also located above the horizontally aligned turn signal lamps 16. As a result, lamps 14 and 16 form the apices and configuration of an isosceles triangle outlined by the phantom chain lines. The left and right brake lamps 18 with CHMSL 12 form a similar isosceles triangle.

The 4-way hazard warning lights have been turned on by the driver, thus causing added lamp 14 and turn signal lamps 16 to flash the triangle traced by the phantom lines. Regardless of whether or not the service brakes are engaged, this flashing hazard warning signal will persist and continue to flash because both these hazard lights and the three brake lamps 12 and 18 are powered by separate independent circuits.

Figure 2:
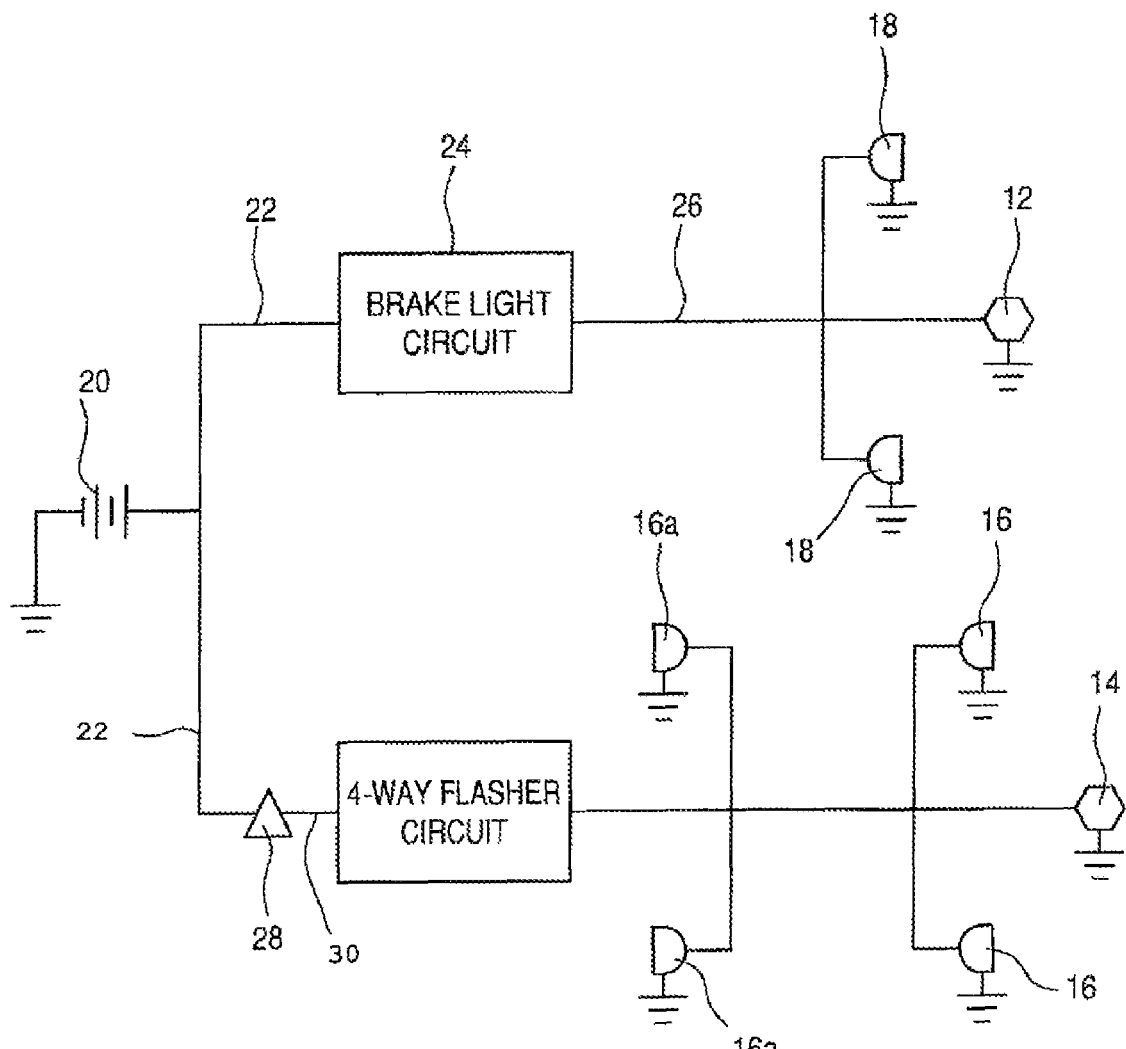
FIG. 2 is a block diagram of a circuit for performing the embodiment illustrated in FIG. 1

This is illustrated in FIG. 2. Battery 20 is illustrated to supply power to the two separate circuits (for safety reasons, USA vehicles can operate brakes and 4-way flasher lamps with the ignition off). Lead 22 delivers power to the brake light circuit 24 which closes a switch upon engagement of the service brakes. Lead 26 then supplies steady current to the lower horizontal stop lamps 18 as well as CHMSL 12. These lamps remain steady on until the brakes are disengaged, whereupon the brake light switch opens and all three lamps turn off.

Lead 22 supplies power to 4-way flasher switch 28. Switch 28 is a push button on or near the dashboard of passenger and light truck vehicles. It is marked with a double outlined triangle to help identify it. When switch 28 is pushed in, the 4-way emergency hazard warning circuit is activated by lead 30, and rear turn signal lamps 16 and front turn signal lamps 16a begin to receive electrical on/off pulses from the circuit. Additional lamp 14 is also activated with such pulses. Therefore, flashing is sustained by all three lamps in the triangular configuration depicted by the phantom chain lines in FIG. 1. This flashing cannot be discontinued by engagement or disengagement of the service brakes since the corresponding stop lamps, CHMSL 12 and the horizontally aligned two other rear stop lamps 18 are neither connected to nor included in the 4-way emergency flasher circuit comprising turn signal lamps 16, 16a and added lamp 14. Lamp 14 may have one or more bulbs in a single housing.

One can visualize from this arrangement that the flashing rear hazard warning lamps 14 and 16 will always maintain their triangular configuration even when the rear stop lamps 18 and CHMSL 12 turn on from engagement of the brakes. The steady triangle created by the stop lamps will complement the triangular rear flashing lamps 14 and 16 of the 4-way emergency flasher group. As a result, there will be symmetry of the two configurations that drivers will quickly recognize as a hazard signal that requires utmost caution and careful slowing or stopping of their approaching vehicles.

Figure 1:
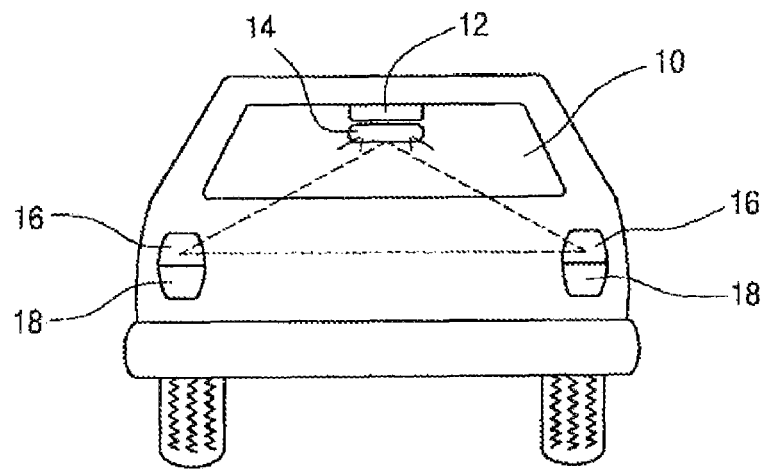
FIG. 1 is a silhouette-like drawing of the back of a passenger vehicle operating in accordance with an embodiment of the invention.

Although, FIG. 1 illustrates the added lamp 14 to be adjacent and below CHMSL 12. Some passenger vehicles have CHMSLs located at the bottom of the rear window, above the trunk lid. In that case, lamp 14 preferably should be located adjacent and above CHMSL 12 in order to maintain symmetry of configurations of the two groups of rear vehicle lamps—the three stop lamps and the three flashing hazard lamps.

Addition of lamp 14 also achieves simplification of installation. After the lamp is affixed to the vehicle's rear window location, the wiring from the lamp can be readily passed through the finished interior liner material, either at the roof or the sides, into the trunk compartment. There the wiring can be easily spliced with one or both of the other two rear emergency lamps, whereby when these two lamps are flashed to begin a hazard warning, so also will the added lamp 14 be flashed simultaneously and synchronously with the four other emergency lamps.

This system also permits flexibility in the colors of the 4-way emergency lamps, which can be red, yellow, amber or orange, whereas the CHMSL 12 is required by NHTSA always to emit red light.

The invention has been described in terms of its functional principles and an illustrative embodiment. Many variants of that embodiment will be obvious to those skilled in the art. Therefore, it should be understood that the ensuing claims are intended to cover all changes and modifications of the illustrative embodiment which fall within the literal scope of the claims, and all equivalents thereof.

The following is claimed:

1. In a motor vehicle having an emergency 4-way flasher circuit with 4-way emergency lamps, three rear stop lights, one of which is a CHMSL, and a brake light switch, an enhanced hazard warning light system which comprises:
   (a) at least one additional lamp located in a position approximately midway between, and above the horizontal alignment of, the vehicle's two rear emergency lamps, said lamp being oriented to beam its illumination toward traffic approaching from the rear,
   (b) means for transmitting pulsed electrical current from the 4-way flasher circuit to the emergency lamps and the additional lamp so that all such lamps flash simultaneously on and off when the 4-way flasher circuit is turned on, and
   (c) means for independently transmitting steady electrical current from the brake light switch to the three rear stop lights including the CHMSL,
   whereby the two rear emergency lamps and the additional lamp flash continuously in a triangular hazard signal pattern without interruption from simultaneous engagement or disengagement of the three rear stop lights while the 4-way flasher circuit is activated, the flashing cycles of the 4-way emergency and additional lamps not including white light during the off periods of such cycles.

2. The system as in claim 1 wherein the additional lamp is located above, beside or below the CHMSL.

3. The system as in claim 1 wherein the additional lamp's illumination is colored red, yellow, orange or amber.

4. The system as in claim 1 wherein the additional lamp's illumination is colored differently than the colors of the two rear emergency lamps.

5. The system as in claim 1 wherein the means for transmitting pulsed electrical current to the additional lamp comprises a conductive wire connecting the input lead of the additional lamp to the input lead of at least one of the two rear emergency lamps.

6. The system as in claim 5 wherein the means for transmitting pulsed electrical current to the additional lamp comprises a conductive wire connecting the input lead of the additional lamp to the input leads of both of the two rear emergency lamps.

7. The system as in claim 1 wherein the vehicle's emergency 4-way lamps comprise its two front and two rear turn signal lamps.

8. The system as in claim 1 wherein the 4-way emergency and additional lamps flash simultaneously and synchronously together.

9. In a motor vehicle having an emergency 4-way flasher with 4-way emergency lamps, three rear stop lamps one of which is a CHMSL, and a brake light switch, a method of creating an enhanced hazard warning light system which comprises:
   (a) locating at least one additional lamp in a position approximately midway between, and above the horizontal alignment of, the vehicle's two rear emergency lamps,
   (b) orienting said additional lamp to beam its illumination toward traffic approaching from the rear,
   (c) transmitting pulsed electrical current from the 4-way flasher circuit to the emergency lamps and the additional lamp so that all such lamps flash simultaneously when the 4-way flasher circuit is turned on, and
   (d) independently transmitting steady electrical current from the brake light switch to the three rear stop lights including the CHMSL, thereby causing the two rear emergency lamps and the additional lamp to flash continuously in a triangular hazard signal pattern without interruption from the engagement or disengagement of the three rear stop lights while the 4-way circuit is activated, the flashing cycles of the 4-way emergency and additional lamps not including white light during the off periods of such cycles.

10. The method as in claim 9 which includes locating the additional lamp above, beside or below the CHMSL.

11. The method as in claim 9 which includes providing an additional lamp which emits light colored red, yellow, orange or amber.

12. The method as in claim 9 which includes providing an additional lamp which emits a different color than the colors of the two rear emergency lamps.

13. The method as in claim 9 which includes activating the vehicle's two front and two rear turn signal lamps to perform the function of 4-way emergency lamps.

14. The method as in claim 9 which includes flashing together the 4-way emergency and additional lamps simultaneously and synchronously.

* * * * *